United States Patent
Kien (10) Patent No.: US 8,526,069 B2
(45) Date of Patent: Sep. 3, 2013

(54) DOCUMENT READING APPARATUS

(75) Inventor: Loi Yew Kien, Singapore (SG)

(73) Assignee: Seiko Epson Corporation, Tokyo (JP)

( * ) Notice: Subject to any disclaimer, the term of this patent is extended or adjusted under 35 U.S.C. 154(b) by 463 days.

(21) Appl. No.: 12/648,195

(22) Filed: Dec. 28, 2009

(65) Prior Publication Data

US 2010/0171995 A1    Jul. 8, 2010

(30) Foreign Application Priority Data

Jan. 5, 2009    (JP) ................................. 2009-000364

(51) Int. Cl.
*H04N 1/04* (2006.01)

(52) U.S. Cl.
USPC ............ 358/474; 358/461; 358/488; 358/497

(58) Field of Classification Search
USPC .......................... 358/474, 461, 488, 497, 498
See application file for complete search history.

(56) References Cited

U.S. PATENT DOCUMENTS

| | | | | |
|---|---|---|---|---|
| 5,455,690 | A | * | 10/1995 | Ishikawa ........................ 358/461 |
| 5,574,804 | A | * | 11/1996 | Olschafskie et al. ......... 382/313 |
| 5,768,448 | A | * | 6/1998 | Ichinose ........................ 382/312 |
| 6,249,360 | B1 | * | 6/2001 | Pollard et al. ................. 358/473 |
| 6,292,274 | B1 | | 9/2001 | Bohn |
| 7,773,796 | B2 | * | 8/2010 | Bledsoe et al. ............... 382/141 |
| 2004/0021912 | A1 | * | 2/2004 | Tecu et al. ..................... 358/473 |

FOREIGN PATENT DOCUMENTS

| | | |
|---|---|---|
| JP | 08-139868 A | 5/1996 |
| JP | 09-282084 A | 10/1997 |
| JP | 2000-099709 A | 4/2000 |
| JP | 2000-196832 A | 7/2000 |
| JP | 2001-274961 A | 10/2001 |
| JP | 2002-278696 A | 9/2002 |
| JP | 2006-163836 A | 6/2006 |
| JP | 2007-310894 A | 11/2007 |

* cited by examiner

*Primary Examiner* — Houshang Safaipour
(74) *Attorney, Agent, or Firm* — Kilpatrick Townsend & Stockton LLP (57) ABSTRACT

A document reading apparatus is provided, which includes a housing having an opening in a reading surface, an imaging portion, arranged within the housing, that reads a document via the opening, and a position detection portion arranged within the opening.

5 Claims, 8 Drawing Sheets

DOCUMENT READING APPARATUS

This application claims priority to Japanese Patent Application No. 2009-000364, filed Jan. 5, 2009 the entirety of which is incorporated by reference herein.

BACKGROUND

1. Technical Field

The invention relates to a document reading apparatus for reading characters or images on a document.

2. Related Art

Stationary scanners are widely used as a document reading apparatus (also called an image reading apparatus). In the stationary scanners, the scanning of a document is accomplished by moving either of a document reading portion or a document arranged in the interior of the apparatus. On the other hand, handy scanners are also known which read a document by moving (scanning) the document reading apparatus body. The handy scanner includes a position detection sensor for sensing the movement direction and the movement amount of the scanner. At least two position detection sensors are required for detecting curved movements of the scanner.

Examples of the above described related art are disclosed in JP-A-8-139868 and JP-A-9-282084.

However, since the handy scanner is constituted so that the body of the scanner is moved, the body of the scanner may go beyond a document when scanning an end of the document, for example, the upper end thereof. When the body of the scanner goes beyond the document, it is not possible to detect the movement direction and the movement amount of the scanner, if one of the two position detection sensors goes beyond from the document. Therefore, in all reading conditions, at least four position detection sensors are required for achieving a high degree of accuracy in reading.

Two position detection sensors are required for detecting the movement direction and the movement amount of the scanner. For this reason, when four position detection sensors are provided, there exists a problem of the increase in cost. In addition, there exists another problem that a space for arranging four position detection sensors is also required, and further reduction of the size of the handy scanner, or of the complexity of the design is restricted.

SUMMARY

An advantage of some aspects of the invention is that it provides a document reading apparatus capable of reducing the number of the position detection portions without lowering the reading performance, regardless of the mode of reading.

A variety of the following aspects to can be adopted in order to solve at least a portion of the above-mentioned problems.

According to a first aspect of the invention, a document reading apparatus is provided. The document reading apparatus according to the first aspect includes a housing having an opening in a reading surface, an imaging portion, arranged within the housing, that reads a document via the opening, and a position detection portion arranged within the opening.

With the document reading apparatus according to the first aspect, since the position detection portion is arranged within the opening, it is possible to reduce the number of the position detection portions without lowering the reading performance, regardless of the mode of reading.

In the document reading apparatus according to the first aspect, it is preferable that two of the position detection portions are arranged in a point symmetry manner with respect to a center point of the opening. In this case, since each of the position detection portions can be separated from each other, it is possible to improve the movement detection accuracy of the document reading apparatus.

In the document reading apparatus according to the first aspect, it is preferable that the opening has at least two opposite sides facing each other, and the two position detection portions are arranged at each of the opposite sides one by one. In this case, since each of the position detection portions can be separated from each other, it is possible to improve the movement detection accuracy of the document reading apparatus. Alternatively, it is preferable that the two position detection portions are arranged adjacent to each other. In this case, it is easy to mount the position detection portion.

It is preferable that the document reading apparatus according to the first aspect further includes a pointing device portion that provides a pointing device function. In this case, the document reading apparatus can also be used as a pointing device.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, with reference to the drawings, the document reading apparatus according to the invention will be described on the basis of the embodiments.

A. Configuration of the Document Reading Apparatus

Figure 1:
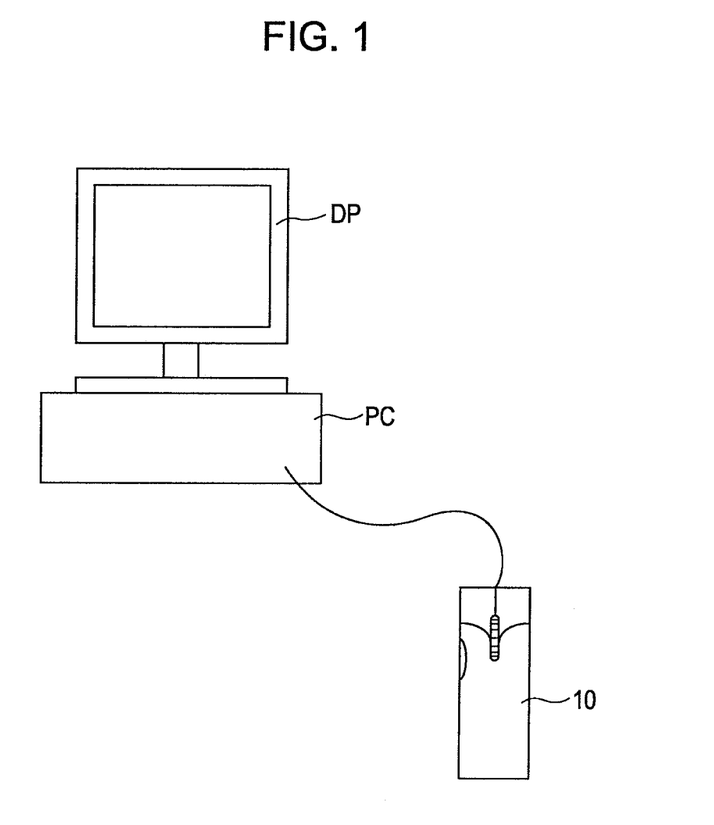
FIG. 1 is an explanatory diagram showing a usage mode of the mouse scanner according to the embodiment.
Figure 2:
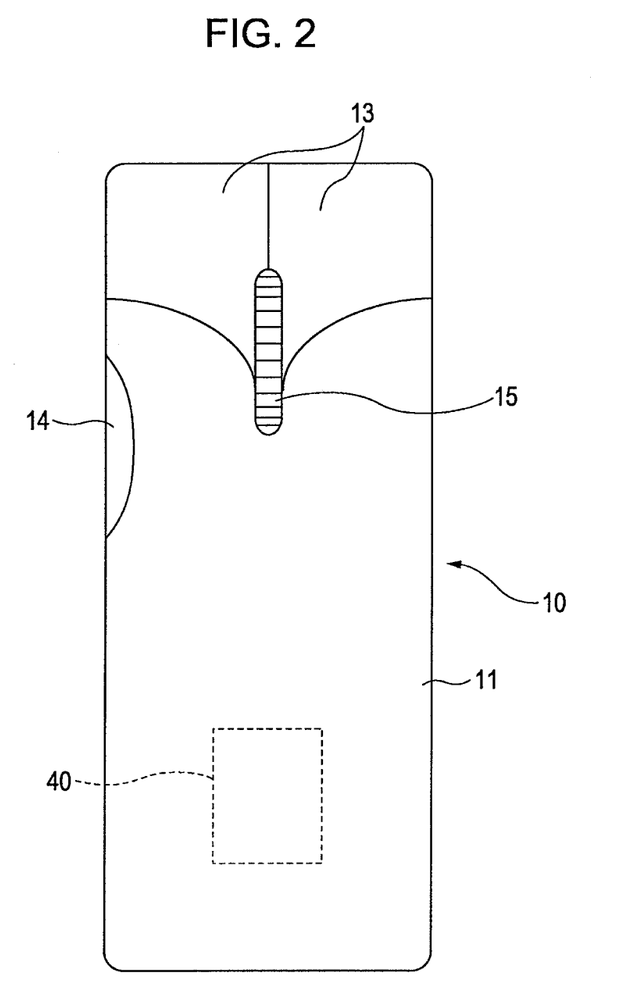
FIG. 2 is a plan view of the mouse scanner according to the embodiment.
Figure 3:
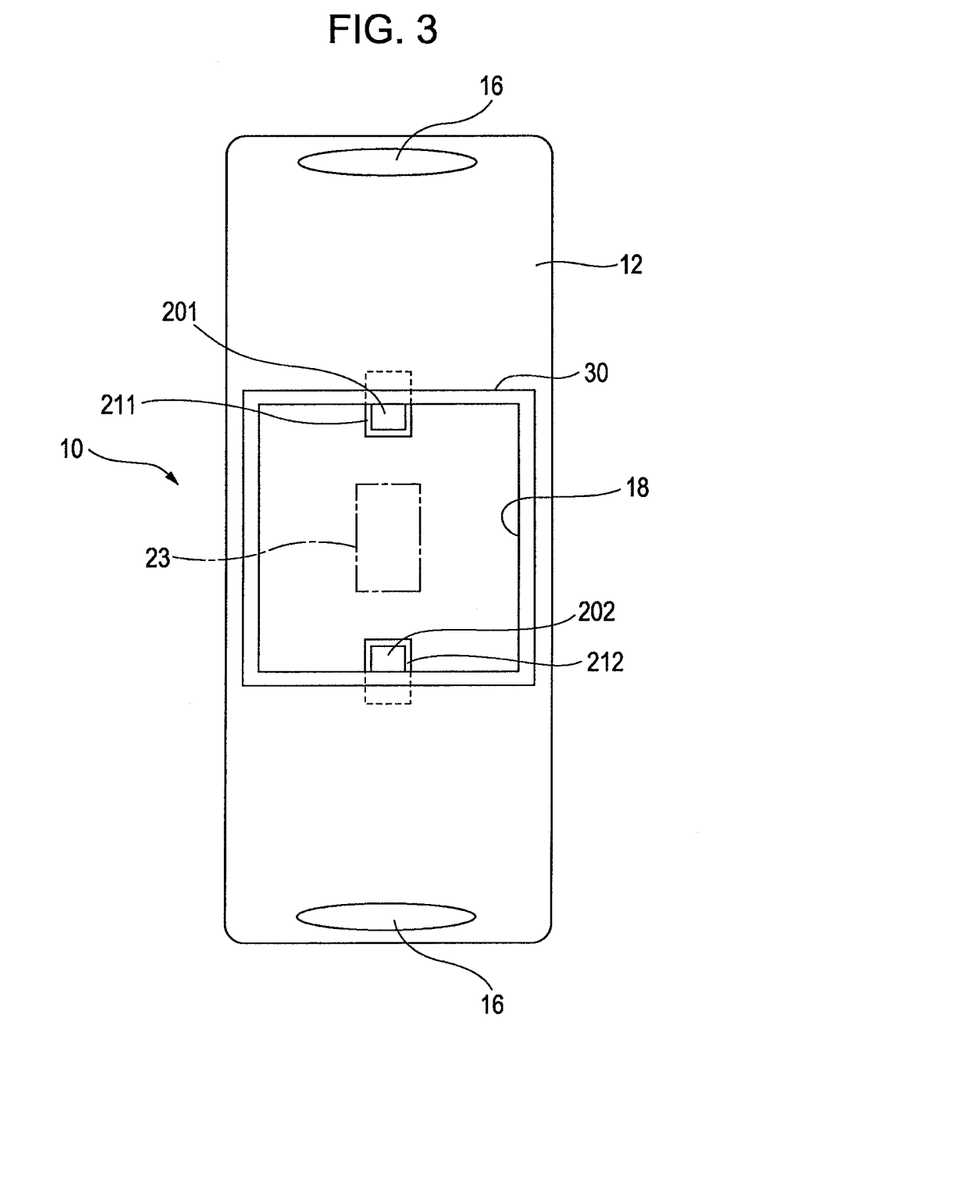
FIG. 3 is a bottom view showing the document reading surface of the mouse scanner according to the embodiment.
Figure 4:
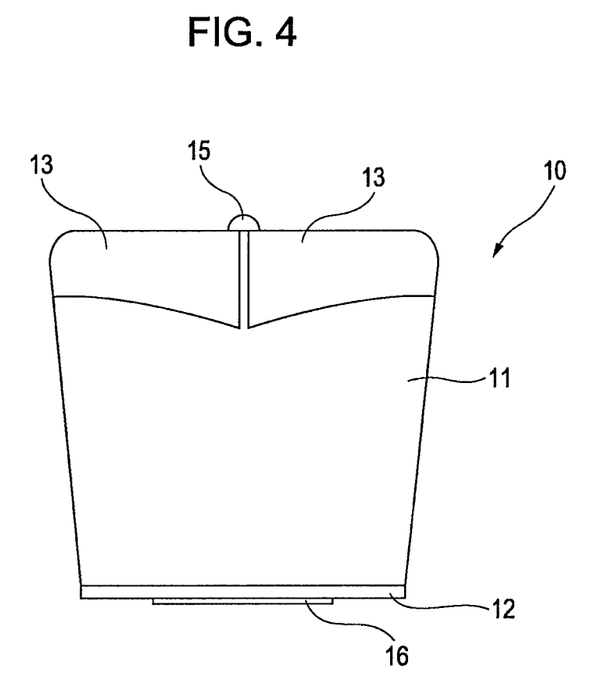
FIG. 4 is a front view of the mouse scanner according to the embodiment.
Figure 5:
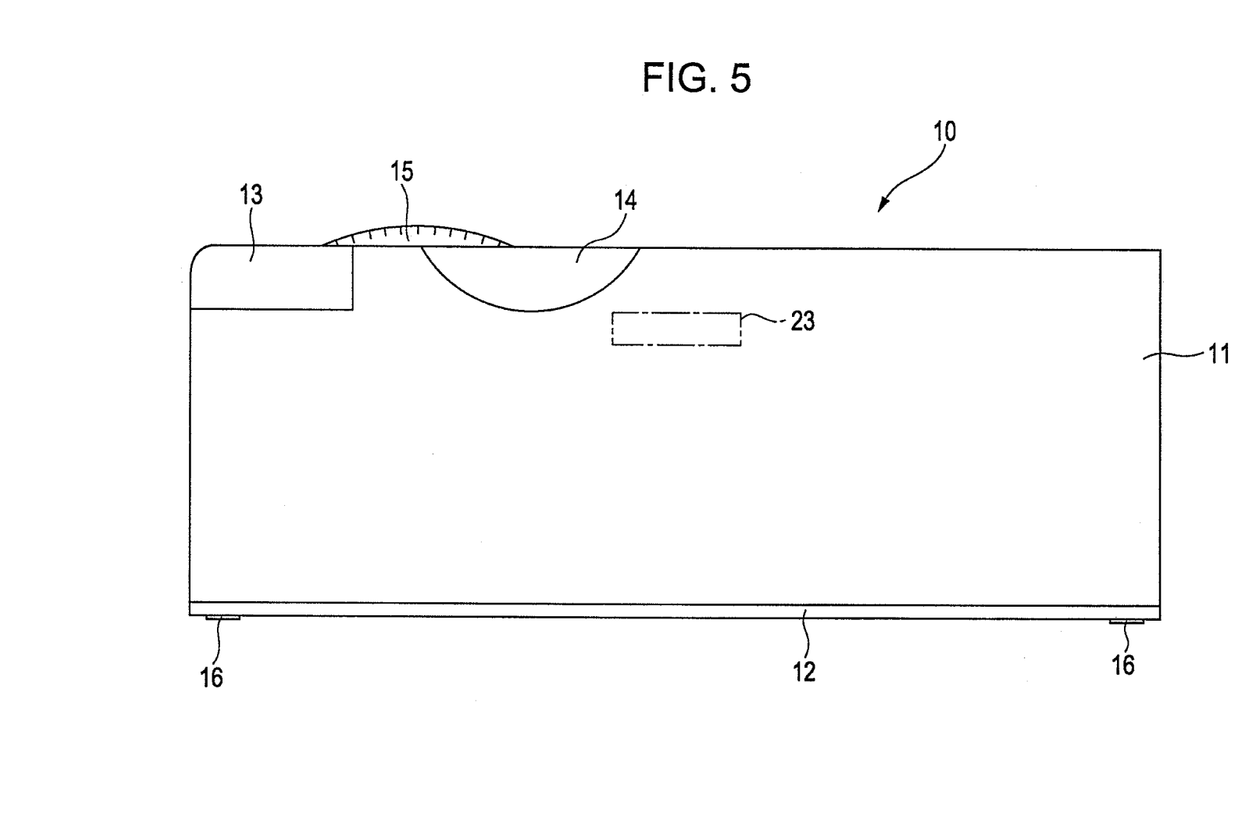
FIG. 5 is a side view of the mouse scanner according to the embodiment.

The appearance configuration of a mouse scanner of the document reading apparatus according to the embodiment will now be described. FIG. 1 is an explanatory diagram showing a usage mode of the mouse scanner according to the embodiment. FIG. 2 is a plan view of the mouse scanner according to the embodiment. FIG. 3 is a bottom view showing the document reading surface of the mouse scanner according to the embodiment. FIG. 4 is a front view of the mouse scanner according to the embodiment. FIG. 5 is a side view of the mouse scanner according to the embodiment.

The mouse scanner 10 has a function as the document reading apparatus and a function as the pointing device. As shown in FIG. 1, the mouse scanner 10 is used as connected via a personal computer PC and a connecting cord. When the mouse scanner functions as a pointing device, a pointer on a display device DP connected to the personal computer PC is moved in response to operations of the mouse scanner 10. When the mouse scanner functions as a scanner, in case of a document being scanned by the mouse scanner 10, the personal computer PC uses read image data of the document which are frequently transmitted from the mouse scanner 10, and position information (X-Y coordinate information) on reading the corresponding document, and then synthesizes the read image data to synthesize image data corresponding to the entire document. Therefore, an image of the document which has been read is frequently displayed on the display device DP in accordance with a reading timing.

The mouse scanner 10 includes a housing 11 having a substantially rectangular parallelepiped shape and a bottom portion 12 forming a bottom surface of the housing 11. In addition, the housing 11 has a shape of which the width in the horizontal direction becomes narrower toward the bottom portion 12 so as to be easily graspable in the palm of a user's hand, as shown in FIG. 4. As shown in FIG. 2 and FIG. 5, a top surface of the housing 11 is provided with buttons 13 and a wheel 14 for functioning as a pointing device, and a scanner selection button 15 for operating as a scanner. The mouse scanner 10 includes a control portion 40 as described later in the inside. In the embodiment, when the mouse scanner is functioning as a pointing device, pushing the scanner selection button 15 causes the mouse scanner to function as a scanner, and when the mouse scanner functions as a scanner, pushing the scanner selection button 15 causes the function as a scanner to be cancelled. Alternatively, while the scanner selection button 15 is continuously pushed, the mouse scanner may function as a scanner.

As shown in FIG. 3, the bottom portion 12 of the mouse scanner 10, that is, a document reading surface is provided with first and second position detection sensors 201 and 202, a document reading opening 18, a cover 30, and pads 16.

The document reading opening 18 is a rectangular opening at which the mouse scanner 10 reads a document, and is covered by the transparent cover 30. The cover 30 may be either of products made of resin or glass. When a document is read, the pads 16 are fragmentary members which are used to improve the operability of the mouse scanner 10 by lowering the contact resistance with respect to a document surface and a contact surface when operating the mouse. Resin such as, for example, Teflon resin having low surface resistance is used as the pad.

In the embodiment, the first and second position detection sensors 201 and 202 are arranged within the document reading opening 18. More particularly, the first and second position detection sensors 201 and 202 can be arranged to contact the document reading opening 18 so as to form point symmetry with respect to the center of the document reading opening 18, or to be opposite to each other in the document reading opening 18. The first and second position detection sensors 201 and 202 arranged within the document reading opening 18 are, for example, optical sensors using a light source such as a laser sensor and an LED, and are mounted in substrates 211 and 212, respectively. These position detection sensors 201 and 202 can separately detect movement amounts of the X direction and the Y direction of the mouse scanner 10, respectively. It is possible to detect rotation amounts in addition to the movement amounts of the X direction and the Y direction of the mouse scanner 10, by being provided with two position detection sensors and using the difference between the output values of both position detection sensors.

In the embodiment, since the first position detection sensor 201 and the second position detection sensor 202 are arranged within the document reading opening 18, it is possible to accurately detect the movement direction and the movement amount of the mouse scanner, regardless of the document scanning mode and document scanning alignment of the mouse scanner 10 by being provided with at least two position detection sensors. Therefore, it is possible to reduce the number of the position detection sensors required for the mouse scanner.

As shown in FIG. 5, an imaging portion 23 is arranged in the inside of the mouse scanner 10 and in the upper side of the document reading opening 18. The imaging portion includes a photoelectric conversion device (imaging device) which converts light information such as CCD or CMOS into electrical information, a light source portion which applies reading lights to a reading object, and a requisite reflection portion. The photoelectric conversion device includes a plurality of photoelectric conversion elements (imaging elements) in which RGB filters are arranged in a predetermined arrangement order, and voltage or current signals are output in accordance with the received light intensity. When the electrical signal values (image signals) of three components of R, G, and B representing one pixel of a reading object, for example, 8 bit grayscale values are allocated to each of the components in accordance with the intensity of light received by each of the photoelectric conversion elements, the imaging portion 23 outputs values between 0 and 255 to each of the components.

Internal Configuration of the Mouse Scanner

Figure 6:
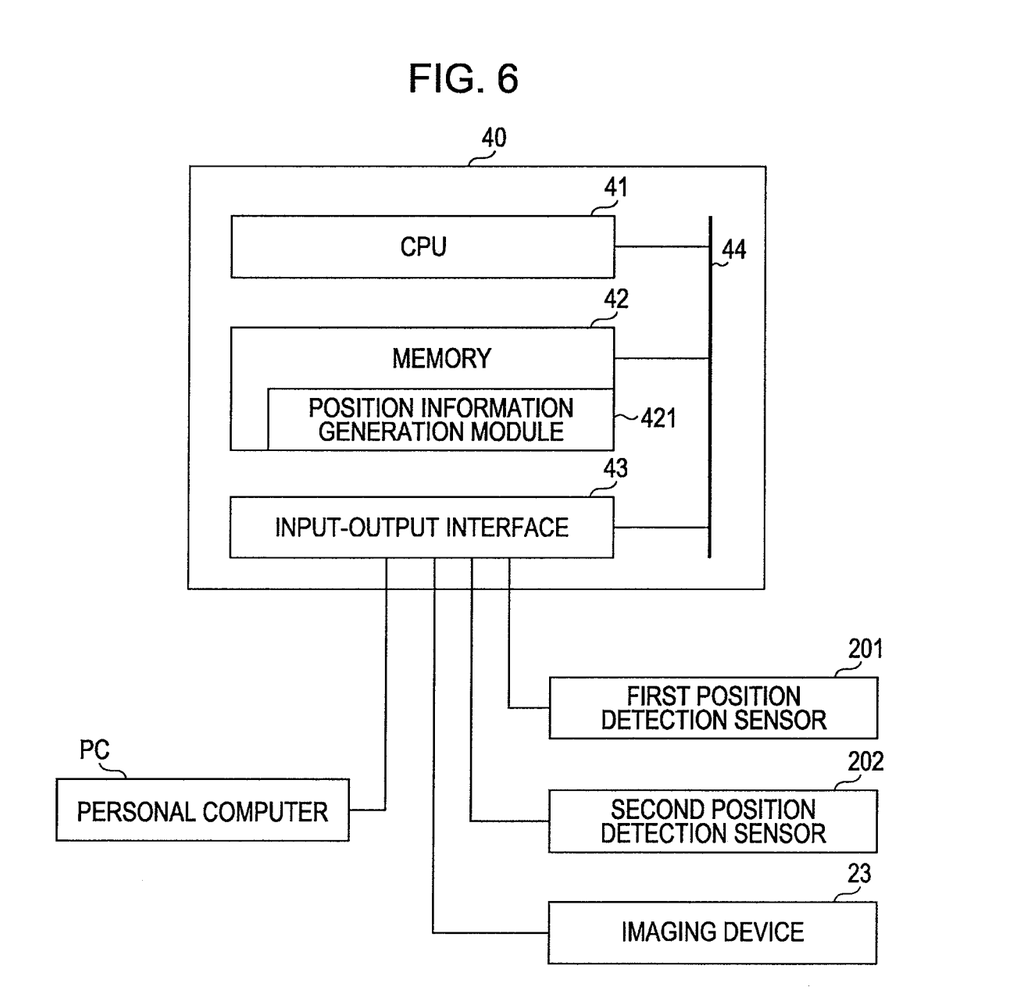
FIG. 6 is a functional block diagram schematically showing the internal configuration of the mouse scanner according to the embodiment.

FIG. 6 is a functional block diagram schematically showing the internal configuration of the mouse scanner according to the embodiment. The mouse scanner 10 according to the embodiment includes the control portion 40. The control portion 40 includes a CPU 41, a memory 42, an input-output interface 43, and a bidirectional internal bus 44. The control portion 40 is connected with the personal computer PC via a connecting cable. The CPU 41 is a so-called central processing unit, and executes various types of programs stored in the memory 42 to allow the mouse scanner to function as a pointing device or a scanner. The memory 42 includes a position information generation module 421, and also includes an image developing region for developing (read) image data by the imaging portion 23. The first and second position detection sensors 201 and 202, and the imaging portion 23 are connected to the input-output interface 43, and the personal computer PC is also connected to the interface via the connecting cable. The CPU 41, the memory 42 and the input-output interface 43 are bidirectionally communicably connected to each other via the bidirectional internal bus 44.

When the mouse scanner 10 is used as a scanner, the position information generation module 421 generates the position information indicative of the position of the mouse scanner 10 using the position detection signals output from the first and second position detection sensors 201 and 202. When the mouse scanner 10 is used as a mouse, the module generates the position information indicative of the position of the pointer using the position detection signals output from the first or second position detection sensors 201 and 202, or using the position detection signals output from the first and second position detection sensors 201 and 202. When the mouse scanner 10 is used as a scanner, the position information generated by the position information generation module 421 is transmitted to the personal computer PC via the connecting cable together with the read image data. When the mouse scanner 10 is used as a mouse, the position information generated by the position information generation module 421 is transmitted to the personal computer PC via the connecting cable as information indicative of the operational amount (movement amount) of the mouse. The personal computer PC moves the pointer displayed on the display device DP in accordance with the received position information (X-Y coordinate information). Each of the modules in the embodiment can be fulfilled by executing each of the modules as software by the CPU 41, or as hardware in which logic circuitry is constructed.

Process for Synthesizing an Image Read by the Mouse Scanner

Figure 7:
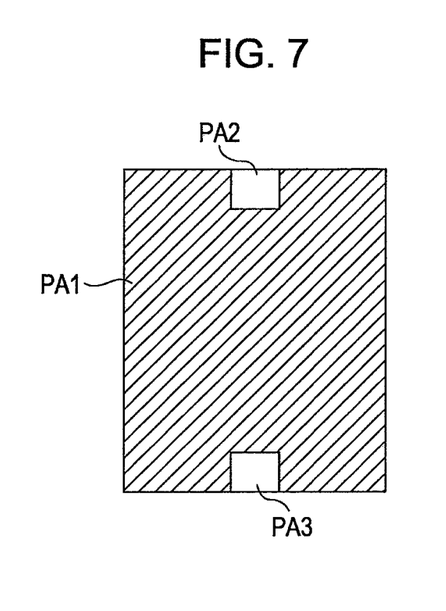
FIG. 7 is an explanatory diagram showing an image read by the mouse scanner according to the embodiment.
Figure 8:
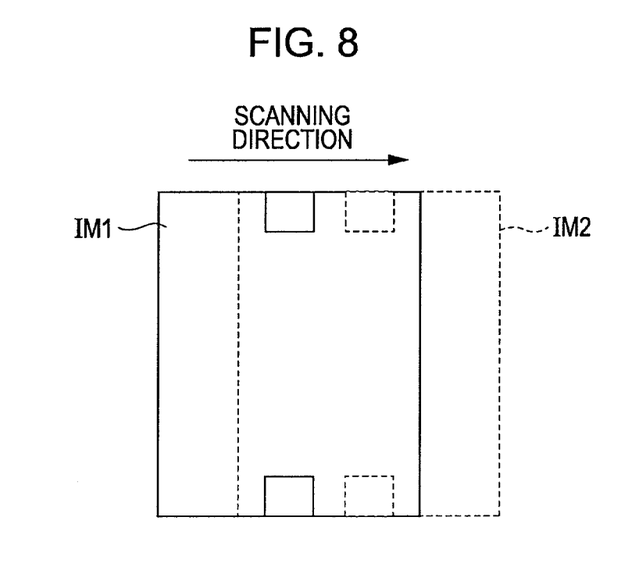
FIG. 8 is an explanatory diagram for describing a synthesis process for image data read by the mouse scanner according to the embodiment.

FIG. 7 is an explanatory diagram showing an image read by the mouse scanner 10 according to the embodiment. FIG. 8 is an explanatory diagram for describing a synthesis process for image data read by the mouse scanner 10 according to the embodiment. In the embodiment, the first and second position detection sensors 201 and 202 are arranged within the document reading opening 18. Therefore, a first non-imaging region PA2 corresponding to the first position detection sensor 201, and a second non-imaging region PA3 corresponding to the second position detection sensor 202 are included in an image PA1 read by the mouse scanner 10 at an arbitrary timing (position), as shown in FIG. 7. Meanwhile, the images in FIG. 7 and FIG. 8 represent a conceptual image of an image which is being developed within the memory 42 of the mouse scanner 10 or within the memory of the personal computer PC, or a display image which is being displayed on the display device DP connected to the personal computer PC.

As a user scans a document surface with the mouse scanner 10, the first non-imaging region PA2 and the second non-imaging region PA3 formed at each imaging timing (reading timing) become different from each other. That is, as shown in FIG. 8, a first image IM1 is read at an arbitrary timing, and a second image IM2 is read at the next timing. At this time, a region on the document which was a non-imaging region in the first image IM1 is read in the second image IM2 (an image is generated). Meanwhile, the reading timing in the embodiment is a timing at which the first and second position detection sensors 201 and 202 output the position information.

Therefore, the non-imaging region in the first image IM1 can be supplemented using the second image IM2. In the embodiment, a corresponding interpolation process is executed by an image synthesis module included in the personal computer PC. That is, the personal computer PC cuts off images corresponding to the first non-imaging region PA2 and the second non-imaging region PA3 which are missing in the first image IM1, from the second image IM2, to synthesize them with the first image IM1. The reading position information (X-Y coordinate) output from the position detection sensors 201 and 202 at the reading timing is associated with the image which has been read by the mouse scanner 10 (imaging portion 23), so each pixel position constituting the read image from the resolution of the imaging portion 23 can be specified. Therefore, it is possible to specify the X-Y coordinates of the first non-imaging region PA2 and the second non-imaging region PA3 in the first image IM1, and to specify the X-Y coordinate of a region to be cut off from the second image IM2 by calculating the movement amount (X,Y) of the mouse scanner 10. The personal computer PC can generate a read image having no non-imaging region, by applying (synthesizing) the image cut off from the second image IM2 to the first non-imaging region PA2 and the second non-imaging region PA3 in the first image IM1.

Meanwhile, the image synthesis module in the personal computer PC may display sequential read images on the display device DP using the image data read by the mouse scanner 10 and stored in the memory, or may display the image having no first non-imaging region PA2 and second non-imaging region PA3 on the display device DP using the image data of which the synthesis process has been completed. In the former case, first of all, the first image IM1 having the first non-imaging region PA2 and the second non-imaging region PA3 is displayed on the display device DP, and in the next reading timing, the first image IM1 having no first non-imaging region PA2 and second non-imaging region PA3, and the second image IM2 having the first non-imaging region PA2 and the second non-imaging region PA3 are displayed on the display device DP. Meanwhile, the first non-imaging region PA2 and the second non-imaging region PA3 in the second image IM2 may be supplemented using the first image IM1, or may be supplemented using a third image to be read next.

As described above, since the mouse scanner 10 according to the embodiment includes the first and second position detection sensors 201 and 202 in the document reading opening 18, it is possible to accurately detect the movement direction and the movement amount of the mouse scanner, regardless of the document scanning mode and document scanning alignment of the mouse scanner 10 by being provided with at least two position detection sensors. Therefore, it is possible to reduce the number of the position detection sensors required for the mouse scanner.

In addition, the images of the first non-imaging region PA2 and the second non-imaging region PA3 which are missing can be supplemented using the image data read at another timing, by being provided with the first and second position detection sensors 201 and 202 within the document reading opening 18. Therefore, the mouse scanner is provided with the first and second position detection sensors 201 and 202 within the document reading opening 18, to thereby have no influence on the quality of the read image.

Figure 9:
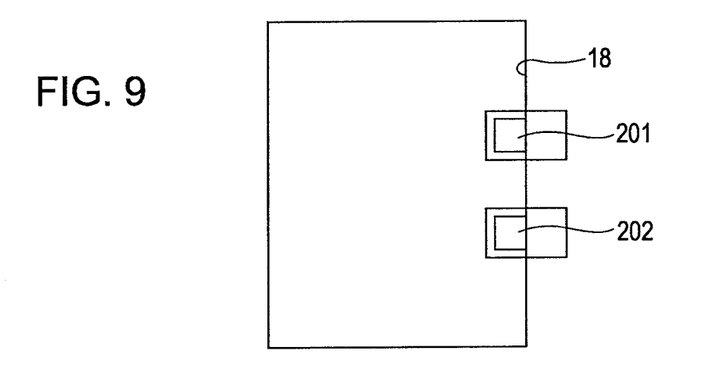
FIG. 9 is an explanatory diagram showing the first modified example of the arrangement positions of the first and second position detection sensors.
Figure 10:
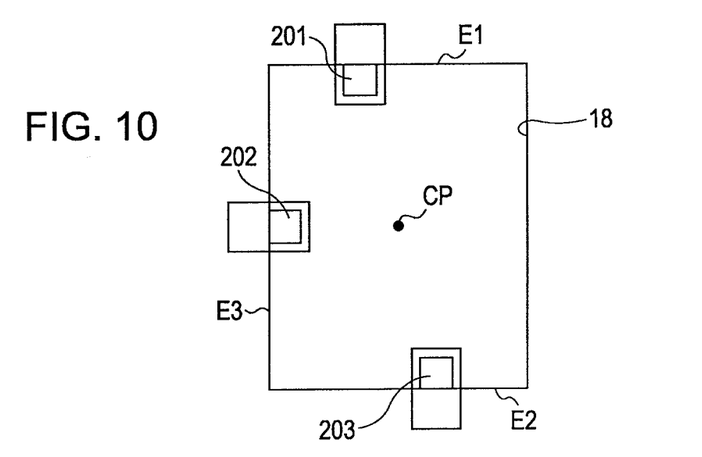
FIG. 10 is an explanatory diagram showing the second modified example of the arrangement positions of the first and second position detection sensors.

Modified Examples (1) Descriptions will be given of modified examples of the arrangement positions of the first and second position detection sensors 201 and 202 with reference to FIG. 9 and FIG. 10. FIG. 9 is an explanatory diagram showing the first modified example of the arrangement positions of the first and second position detection sensors 201 and 202. FIG. 10 is an explanatory diagram showing the second modified example of the arrangement positions of the first and second position detection sensors 201 and 202.

In the first modified example, the first and second position detection sensors 201 and 202 are provided within the document reading opening 18 along the same side of the rectangular document reading opening 18. In the second modified example, a third position detection sensor 203 is provided in addition to the first and second position detection sensors 201 and 202. The first and third position detection sensors 201 and 203 are provided within the document reading opening 18 with the point symmetry being formed with respect to the center point CP of the rectangular document reading opening 18. The second position detection sensor 202 is arranged in the side E3 adjacent to the sides E1 and E2 of the document reading opening 18 provided with the first and third position detection sensors 201 and 203. In each case, it is possible to obtain the effect of action which is obtained by the embodiment. Further, when the mouse scanner 10 is used along with a positioning member to assist the scanning, that is, not to control or permit a rotation operation of the mouse scanner 10, only one position detection sensor may be provided.

Figure 11:
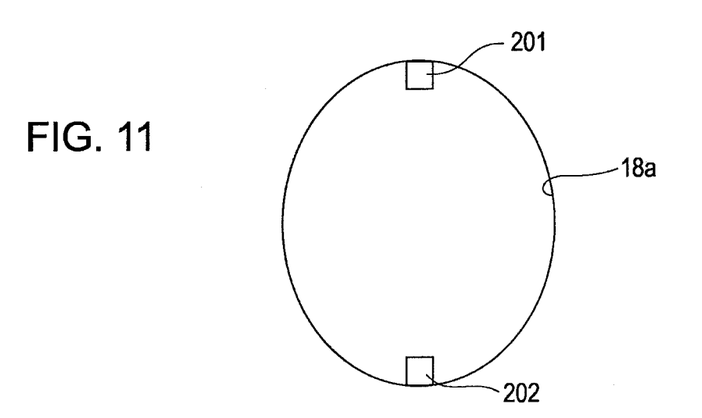
FIG. 11 is an explanatory diagram showing a modified example of the shape of the opening for reading the document.

(2) A modified example of the shape of the document reading opening will be described with reference to FIG. 11. FIG. 11 is an explanatory diagram showing a modified example of the shape of the document reading opening. Although the mouse scanner 10 is a rectangular parallelepiped shape, and has been described using the rectangular (oblong) document reading opening 18 in order to secure the maximum reading area in the above-mentioned embodiment, a circular document reading opening 18a may be used as shown in FIG. 11. For example, it is useful for a case where the mouse scanner 10 is hemispherically shaped. In addition to this, the document reading opening can take a variety of shapes in accordance with a two-dimensional shape of the reading surface of the mouse scanner.

(3) In the above-mentioned embodiment, although the interpolation process of the first non-imaging region PA2 and the second non-imaging region PA3 has been executed by the personal computer PC, the corresponding interpolation process may be executed in the mouse scanner 10. In this case, the image synthesis module for executing a synthetic image process is provided, and the memory 42 of the mouse scanner 10 is provided with a storage area for developing the first image data read at the first timing, and a working area for generating the synthetic image data dynamically using the second image data read at the second timing. In addition, the memory 42 includes a storage area for developing the second image data. After the second image data have been developed, the synthesis process of the image data may be executed by the image synthesis module. In each case, since the image data after the synthesis are output to the personal computer PC, the image having no first non-imaging region PA2 or second non-imaging region PA3 is displayed on the display device DP.

(4) In the above-mentioned embodiment, the first and second position detection sensors 201 and 202 are arranged so as to contact the document reading opening 18 for the purpose of reducing the non-imaging region to a minimum. However, when a larger non-imaging region is permitted, the sensors may be arranged within the document reading opening 18 without contacting the document reading opening 18. In addition, when a signal line (light transmissive signal line) which does not obstruct the reading of a document by the imaging portion 23 can be used as a signal line for outputting the detection signals from the position detection sensors to the control portion 40, the position detection sensors do not contact the document reading opening 18, and the widths of the sensors become equivalent to those of the non-imaging regions in the above-mentioned embodiment even though the sensors are arranged within the document reading opening 18. In each case, the non-imaging region in the last image is supplemented by the current image, to thereby allow a read image having no loss to be obtained.

(5) In the above-mentioned embodiment, the personal computer PC and the mouse scanner 10 are connected to each other via the connecting cable, but they may be connected to each other via wireless communication.

(6) In the above-mentioned embodiment, although the mouse scanner having a mouse (pointing device) function has been described by way of example, it may be embodied as a handy scanner having no mouse function. That is, a series of image reading processes in above-mentioned embodiment can be executed with or without the mouse function.

Hereinbefore, although the invention has been described on the basis of the practical examples and the modified examples, the embodiments of the invention described above are for the purpose of facilitating the comprehension of the invention, and do not limit the invention. The invention can be changed and modified without departing from the purport thereof and the claims, and the equivalents thereof are included in the invention.

What is claimed is:

1. A document reading apparatus that is movable between a plurality of positions along a surface of a document, comprising:
    a housing comprising an opening in a reading surface of the housing;
    an imaging element, disposed within the housing, configured to read the document via the opening; and
    a position detection element, disposed within the opening, wherein the position detection element visually blocks a region of the document from the imaging element at each position of the apparatus along the surface of the document;
    wherein the apparatus is configured to:
        at a first position:
            read an unobscured region of the document with the imaging element, and not read a first obscured region of the document that is visually blocked from the imaging element by the position detection element, to create a first acquired image that does not have image data at the first obscured region of the document;
        at a second position, where the position detection element visually blocks a second obscured region of the document and does not visually block the first obscured region:
            read the first obscured region; and
            incorporate image data of the first obscured region, taken at the second position, with the first acquired image, to thereby create a second acquired image that has image data both at the unobscured region and at the first obscured region.

2. The document reading apparatus according to claim 1, wherein the position detection element comprises two position detection elements, disposed in a point symmetry manner with respect to a center point of the opening.

3. The document reading apparatus according to claim 2, wherein the opening comprises at least two opposite sides facing each other, and wherein the two position detection elements are disposed at each of the opposite sides one by one.

4. The document reading apparatus according to claim 2, wherein the two position detection elements are disposed adjacent to each other.

5. The document reading apparatus according to claim 1, further comprising a pointing device element that provides a pointing device function.

* * * * *